(12) United States Patent
Becker

(10) Patent No.: US 7,372,923 B2
(45) Date of Patent: May 13, 2008

(54) METHOD FOR EQUALIZATION OF A PAYLOAD SIGNAL, TAKING INTO ACCOUNT AN INTERFERENCE SOURCE

(75) Inventor: Burkhard Becker, Ismaning (DE)

(73) Assignee: Infineon Technologies AG (DE)

( * ) Notice: Subject to any disclaimer, the term of this patent is extended or adjusted under 35 U.S.C. 154(b) by 693 days.

(21) Appl. No.: 11/015,042

(22) Filed: Dec. 17, 2004

(65) Prior Publication Data

US 2005/0135522 A1    Jun. 23, 2005

Related U.S. Application Data

(60) Provisional application No. 60/531,070, filed on Dec. 19, 2003.

(51) Int. Cl.
*H04B 1/10* (2006.01)
*H04L 1/00* (2006.01)
(52) U.S. Cl. .................. 375/341; 375/229; 375/346
(58) Field of Classification Search ........ 375/229–233, 375/341, 346, 350; 714/792, 794–796
See application file for complete search history.

(56) References Cited

U.S. PATENT DOCUMENTS 6,038,269 A * 3/2000 Raghavan .................. 375/340

7,099,412 B2 * 8/2006 Coffey ........................ 375/341

FOREIGN PATENT DOCUMENTS

DE     100 32 237 A1    1/2002

OTHER PUBLICATIONS

Ilango, Anard S. et al., "Near-Optimal Low Complexity Joint Estimation of Cochannel ISI Signals for Mobile Receivers", IEEE 49th Vehicular Technology Conf.; vol. 2, pp. 1330-1334, May 1999.
Giridhar, K., et al.; "Non-linear Techniques for the Joint Estimation of Chochannel Signals", IEEE Transactions on Communications; vol. 45, No. 4., pp. 473-484, Apr. 1997.

* cited by examiner

*Primary Examiner*—David B. Lugo
(74) *Attorney, Agent, or Firm*—Dickstein, Shapiro, LLP.

(57) ABSTRACT

In a method for equalization of a signal which is transmitted via a payload channel taking into account at least one interference channel, the trellis diagram for the interference channel is processed over an interval of time units. The symbols received in the interval of time units are then corrected by means of information which has been obtained during the processing of the trellis diagram for the interference channel. The trellis diagram for the payload channel is then processed over the same interval of time units, using the corrected symbols.

20 Claims, 6 Drawing Sheets

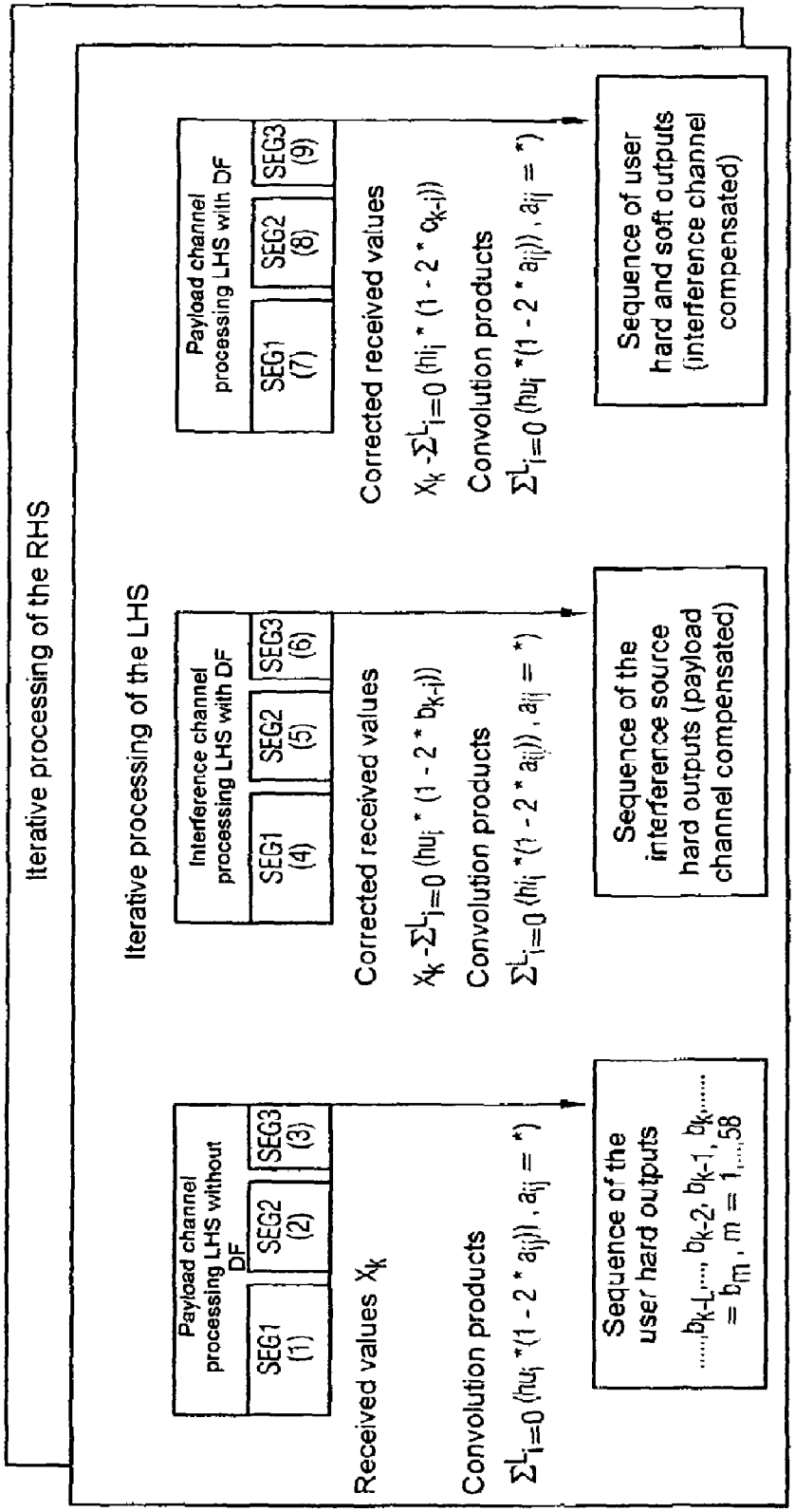

METHOD FOR EQUALIZATION OF A PAYLOAD SIGNAL, TAKING INTO ACCOUNT AN INTERFERENCE SOURCE

PRIORITY

This application claims priority to and is a conversion of U.S. Provisional Application Ser. No. 60/531,070 filed Dec. 19, 2003.

TECHNICAL FIELD OF THE INVENTION

The present invention relates to a method for equalization of a signal which is transmitted via a payload channel, taking into account at least one interference channel.

DESCRIPTION OF RELATED ART AND BACKGROUND OF THE INVENTION

Various interference influences which must be taken into account in the signal detection at the receiver end occur during the transmission of radio signals between a transmitter and a receiver. Firstly, the signal is subject to distortion which is caused by there generally being two or more possible signal propagation paths. Reflection, scatter and diffraction of signal waves on obstructions such as buildings, mountains and the like result in the received field strength at the receiver being composed of a number of signal components which are generally subject to different delay and have different intensities. This phenomenon, which is referred to as multipath propagation, causes the distortion of the transmitted data signal which is known as intersymbol interference (ISI).

Other active subscribers represent a further cause of interference. The interference caused by these subscribers is referred to as multiple access interference (Multi Access Interference: MAI). A situation frequently occurs in which a dominant interference source or interference channel actually has a serious adverse effect on the signal detection in the payload channel.

First of all, only one channel will be considered, that is to say MAI will be ignored. This multipath transmission channel between the transmitter S and the receiver E can be modelled as a transmission filter H with a channel coefficient $h_k$ as is illustrated in FIG. 1. The transmitter S feeds transmission symbols $s_k$ into the transmission channel, that is to say the channel model transmission filter H. An additive noise contribution $n_k$, which is added to the transmission symbols $s_k$ which have been filtered with $h_k$ at the output of the channel model transmission filter H, can be taken into account by a model adder SU.

The index k denotes the discrete time in time units of the symbol clock rate. The transmission signals $s_k$, which have been filtered by the transmission filter H and on which noise has been superimposed are received as the received signal $x_k$ by the receiver E, in which case:

$$x_k = \sum_{i=0}^{L} h_i s_{k-i} + n_k \tag{1}$$

where L represents the order of the transmission channel being modelled by the filter H. As can be seen from equation (1), ISI is present since $x_k$ depends not only on $s_k$ but also on $s_{k-1}, \ldots, s_{k-L}$.

FIG. 2 shows the channel model transmission filter H. The filter H comprises a shift register composed of L memory cells Z. There are taps (a total of L+1 of them) before and after each memory cell Z, which lead to multipliers which multiply the values of the symbols $s_k, s_{k-1}, \ldots, s_{k-L}$ (which are inserted into the shift register via an input IN at the symbol clock rate $T^{-1}$ by the corresponding channel impulse responses $h_0, h_1, \ldots, h_L$. An output stage AD of the filter H adds the outputs of the L+1 multipliers, thus resulting in an output signal OUT in accordance with equation 1.

The memory contents of the channel model shift register describe the state of the channel. The memory contents of the first memory cell on the input side contain the symbol $s_{k-1}$ (which is multiplied by $h_1$) in the time unit k, and the other memory cells Z are filled with the symbols $s_{k-2}, s_{k-3}, \ldots, s_{k-L}$. The state of the channel in the time unit k is thus determined unambiguously by the details of the memory contents, that is to say by the L-tuple $(s_{k-L}, s_{k-L+1}, \ldots, s_{k-1})$.

The received signal values $x_k$ in the receiver E are known as sample values, and the channel impulse responses $h_0, h_1, \ldots, h_L$ of the channel are estimated at regular time intervals. The equalization task comprises the calculation of the transmission symbols $s_k$ from this information. The following text is based on equalization by means of a Viterbi equalizer.

Viterbi equalization is based on finding the shortest route through a state diagram of the channel, which is known as the trellis diagram. The channel states are plotted against the discrete time k in the trellis diagram. According to the Viterbi algorithm (VA), a branch metric which represents a measure of the probability of a transition is calculated for each possible transition between two states (predecessor state relating to the time unit k→destination state relating to the time unit k+1). The branch metrics are then added to the respective state metrics (which are frequently also referred to in the literature as path metrics) of the predecessor states. In the case of transitions in the same final state, the sums obtained in this way are compared. That transition to the final state in question whose sum of the branch metric and state metric of the predecessor state is minimum is selected and forms the extension of the path leading from this predecessor state to the destination state. These three basic VA operations are known as ACS (ADD-COMPARE-SELECT) operations.

While, from the combinational point of view, the number of paths through the trellis diagram increases exponentially as k increases (that is to say as time passes), it remains constant in the case of the VA. The reason for this is the selection step (SELECT). Only the selected path (survivor) survives and can be continued. The other possible paths are rejected. Recursive path rejection is the core concept of VA and is an essential precondition of computationally coping with the problem of searching for the shortest path through the trellis diagram.

The number of channel states (that is to say the number of ways in which the shift register H may be filled) in the trellis diagram, which is identical to the number of paths followed through the trellis diagram, is $p^L$. In this case, p denotes the significance of the data symbols being considered. The computation complexity of VA accordingly increases exponentially with L. Since L should correspond to the length of the channel memory of the physical propagation channel, the complexity for processing the trellis diagram increases as the channel memory of the physical propagation channel increases.

One simple method for reducing the computation complexity is to base the trellis processing on a short channel memory L. However, this has a severe adverse influence on the performance of the equalizer. A considerably more sensible measure for limiting the computation complexity, and which does not have such a serious influence on the quality of the equalizer, is the decision feedback (DF) method. In the DF method, the VA is based on a reduced trellis diagram, that is to say a trellis diagram in which only some of the $p^L$ channel states are considered, rather than all of them. If the trellis diagram is reduced to $p^{L_{DF}}$ trellis states ($L_{DF}$<L), the remaining L–$L_{DF}$ channel coefficients (which are not used for the definition of trellis states) are still taken into account by using them for calculation of the branch metrics in the reduced trellis diagram.

A branch metric between two states must be calculated for each possible transition both during the processing of the complete trellis diagram and of the processing of the reduced trellis diagram (DF situation). The branch metric is the Euclidean distance between the measured signal value or sample value $X_k$ and an estimated "hypothetical" signal value, which is calculated and "tested" with respect to the destination state, the transition from the predecessor state to the destination state, and the path history, taking into account the channel knowledge in the receiver.

In order to explain this, let us assume by way of example that p=2 (binary data signal), that is to say there are $2^L$ (DF situation: $2^{L_{DF}}$) trellis states (0,0, . . . ,0), (1,0, . . . ,0) to (1,1 . . . , 1) comprising L tuples (DF: $L_{DF}$–tuples). A specific hypothetical predecessor state is assumed to be defined by the shift register occupancy ($a_L, a_{L-1}, \ldots, a_1$) (in the DF situation, only the $L_{DF}$ right-hand bits ($a_{L_{DF}}, \ldots, a_1$) of the shift register occupancy are used for the state definition). The hypothetically transmitted symbol (bit) 0 or 1 which leads from the predecessor state ($a_L, a_{L-1}, \ldots, a_1$) in the time step k to the destination state ($a_{L-1}, a_{L-2}, \ldots, a_0$) in the time step k+1 (DF: predecessor state ($a_{L_{DF}}, \ldots, a_1$) to the destination state ($a_{L_{DF}-1}, \ldots, a_0$) is annotated $a_0$. With or without DF, the branch metric $BM_k$ is:

$$BM_k = |\text{sample value} - \text{estimated signal value}|^2$$

$$= \left| X_k - \left( \sum_{i=1}^{L} h_i(1 - 2 \cdot a_i) + h_0(1 - 2 \cdot a_0) \right) \right|^2 \text{ for } a_i = \{0, 1\} \quad (2)$$

The estimated signal value (also referred to in the following text as the estimated symbol) is the sum of products of a channel coefficient and a symbol. For the DF situation, the term $$\sum_{i=1}^{L} h_i(1 - 2 \cdot a_i)$$

may also be split into a trellis contribution and a DF contribution:

$$BM_k = \left| X_k - \right. \quad (3)$$

-continued $$\left. \left( \underbrace{\sum_{i=L_{DF}+1}^{L} h_i(1 - 2 \cdot a_i)}_{\text{DF Contribution}} + \underbrace{\sum_{i=1}^{L_{DF}} h_i(1 - 2 \cdot a_i)}_{\text{Trellis contribution}} + \underbrace{h_0(1 - 2 \cdot a_0)}_{\text{hyp. Symbol contribution}} \right) \right|^2$$

This means that the estimated symbol comprises two (DF situation: three) contributions: a contribution which is determined by the hypothetically transmitted symbol $a_0$ for the transition from the time unit k to the time unit k+1, the trellis contribution, which is given by the predecessor state relating to the time unit k in the trellis diagram, and, in the DF situation, the reduced trellis states also result in the DF contribution.

The branch metric $BM_k$ is always the same, with or without DF. The computation saving in the case of VA with DF results, as already mentioned, from the smaller number $2^{L_{DF}}$ of trellis states to be taken into account in the processing of the trellis diagram, that is to say from the reduction in the trellis diagram.

Furthermore, if it is intended to take into account an interference channel (that is to say a second multipath transmission channel) in the equalization of a data signal, joint VA equalization must be carried out on both channels (the payload channel and the interference channel). An overall trellis diagram is constructed for this purpose, which comprises the states for both channels. As an example: if p=2 (binary data signal) and L=4 for both channels, the trellis diagram for the payload channel comprises 16 states, and the trellis diagram for the interference channel likewise comprises 16 states. The "combinational" overall trellis diagram which forms the basis for joint VA equalization of both signals then comprises 16×16=256 states. If one additional DF bit is taken into account in each case (that is to say L=5, $L_{DF}$=4), the overall trellis diagram still comprises 256 states, but another two DF bits are added as the DF contribution to the calculation of the branch metrics.

The complexity for processing the overall trellis diagram is increased only by a factor of 16 in comparison to the complexity for processing the trellis diagram for the payload channel. When processing the trellis diagram by means of DSP (digital signal processor) control, a solution such as this leads to a very high MIPS load (MIPS: million instructions per second) on the DSP, so that other applications cannot run on the DSP, or can no longer run in an acceptable time. For a payload signal transmitted on the basis of the EDGE (Enhanced Data Rates for GSM Evolution) Standard (where p=8), equalization taking into account an interference source when using the overall trellis diagram is no longer possible in practical mobile radio use, owing to the excessively high DSP load.

In order to reduce the DSP load, it is already known for the processing of the trellis diagram to be assisted by specific dedicated hardware circuits, so-called hardware accelerators. These carry out the ACS operations in a trellis diagram time step by time step. In this case, the hardware accelerators can carry out very largely autonomous processing of the trellis diagram over a number of time units between two channel estimates (which result in a recalculation of the channel coefficients).

The German patent application with the file reference 103 23 407.4, which had not yet been published by the date of application, describes an equalization method in which a signal which is transmitted via a payload channel is equalized using the DF method and taking into account an interference channel. In this method, the trellis diagram for the payload channel and the trellis diagram for the interference channel are processed alternately in each time unit. The information about the interference channel (payload channel) obtained in the time unit under consideration is used as the DF contribution for the processing of the trellis diagram for the payload channel (interference channel) either in the same time unit or for the next time unit. One disadvantage of this procedure is that a specifically constructed hardware accelerator must be implemented owing to the change in the consideration of DF contributions from the respective adjacent channel.

The German laid-open specification DE 100 32 237 A1 describes a Viterbi equalizer which comprises a DSP as well as a hardware accelerator for carrying out the ACS operations. The hardware accelerator comprises a first hardware calculation circuit, which calculates partial sums of branch metric values, and calculates the branch metric values from new partial sums. A second hardware calculation circuit accesses the partial sums and branch metric values calculated in the first hardware calculation circuit, and carries out the ACS operations time step by time step. Reconfiguration of the hardware accelerator takes place only when a new channel estimate is produced, since the first hardware calculation circuit has to calculate new partial sums of the branch metric values, and the branch metric values from new partial sums, at this time.

SUMMARY OF THE INVENTION

The invention is based on the object of specifying a method for equalization of a payload channel taking into account an interference channel, which allows the interference channel to be taken into account in the equalization of the payload channel with as little complexity as possible. One particular approach is to allow the method according to the invention to be carried out without any physical change to the hardware accelerator in a conventional equalizer which comprises a DSP and a hardware accelerator.

Equalization of a signal which is transmitted via a payload channel, and taking into account at least one interference channel, comprises the following steps: (a) processing of the trellis diagram for the interference channel over an interval of time units; (b) correction of the symbols received in the interval of time units by means of information which has been obtained during the processing of the trellis diagram for the interference channel; and (c) processing of the trellis diagram for the payload channel over the same interval of time units using the corrected symbols.

No combinational overall trellis diagram is formed in the method according to the invention, instead of which the payload channel trellis diagram and the interference channel trellis diagram are equalized separately. The correction of the symbols which are received in the interval of time units by means of information which has been obtained during the processing of the trellis diagram for the interference channel takes account of the interaction with the interference channel during the processing of the trellis diagram for the payload channel (step (c)). Furthermore, the respective trellis diagrams (payload channel, at least one interference channel) are each processed over a number of time units (so-called interval of time units) in the method according to the invention. Since no alternating processing of the trellis diagrams is carried out per time unit, but each trellis diagram is always processed over a cohesive time interval, this results in a procedure which is comparable to the conventional processing of a payload channel trellis diagram (without taking into account an interference channel), except for the required "switching" between the trellis diagrams after the time interval has elapsed.

The processing of the trellis diagrams for the payload channel and for the interference channel is preferably carried out by means of a dedicated hardware circuit, which is also referred to in the following text as a "hardware accelerator", while the correction of the symbols which are received in the interval of time units is carried out in a software module (for example a DSP). Since the correction of the received symbols is carried out in the software module, there is no difference for the hardware accelerator between the processing of the trellis diagram for the interference channel in step (a), and that for the payload channel in step (c). To this extent, both trellis processing operations (with and without interaction from the respective adjacent channel) can be carried out with one and the same hardware accelerator. In other words, the method according to the invention can be implemented by a simple firmware update to known equalizer hardware (DSP with a hardware accelerator).

One particularly advantageous embodiment variant of the method according to the invention is characterized in that the following steps are carried out before step (a): (i) initial processing of the trellis diagram for the payload channel over the interval of time units; and (ii) correction of the symbols received in the interval of time units by means of information which has been obtained during the processing of the trellis diagram for the payload channel in step (i) with the symbols corrected in step (ii) being used for the interference channel trellis processing in step (a).

That is to say, in this case, (only) the initial processing of the trellis diagram for the payload channel (step (i)) without interaction with the adjacent channel (interference channel) is carried out. The processing operations for the interference channel and for the payload channel carried out in the steps (a) and (c) are each carried out using corrected sample values in order to take into account a DF contribution from the respective adjacent channel. The repeated processing of the trellis diagram for the payload channel over the same interval of time units thus differs from the initial processing of the trellis diagram (step (i)) in that corrected received symbols are used. This correction of the symbols results in the inclusion of a DF contribution from the interference channel in the calculation of the branch metric values, in comparison to the initial processing of the trellis diagram for the payload channel. The estimated symbols on which the calculation of the branch metric values is based need not be changed, that is to say they are identical to the convolution products used in step (i).

As in step (b), the sample value corrections in step (ii) are preferably carried out in the software module (DSP), so that the wiring of the hardware accelerator is independent of whether or not a DF contribution for the adjacent channel is taken into account. Thus, as already explained, the same hardware accelerator can be used in this case as well for all of the trellis processing operations; all that is necessary is to configure the hardware accelerator in steps (a) and (c) with the respective corrected symbols.

Since the payload channel in this method variant is equalized "twice" over the same interval of time units, this is referred to as iterative equalization. Iterative equalization allows the interference channel interference to be reduced particularly well.

The length of the time interval has a significant influence both on the performance of the method according to the invention and on the MIPS load on the software module. In general, a shorter interval length improves the performance of the method, but also results in a higher load on the software module. According to one advantageous embodiment variant of the method according to the invention, the interval length is thus controllable, so that a suitable compromise can be found between equalization quality and processor loading, depending on the circumstances.

BRIEF DESCRIPTION OF THE DRAWINGS

The invention will be explained in more detail in the following text using an exemplary embodiment and with reference to the drawings, in which:

FIG. 6 shows a schematic illustration in order to explain the processing of the trellis diagram for the payload channel (duplicated) and of the trellis diagram for the interference channel (once) for an interval width which corresponds to half a time slot;

DETAILED DESCRIPTION OF EMBODIMENTS

Figure 1:
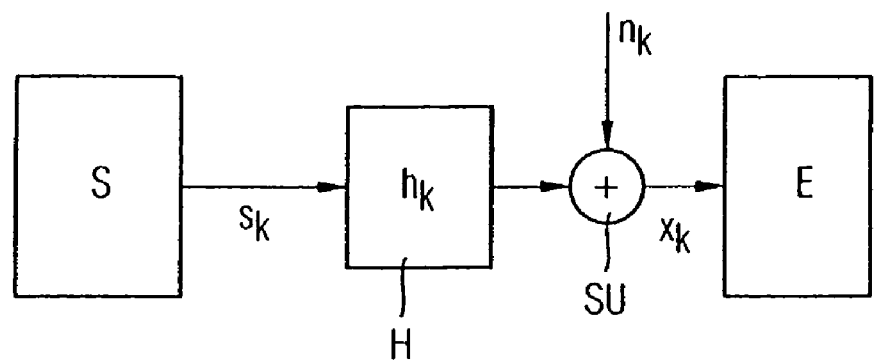
FIG. 1 shows a schematic illustration of a model of the physical transmission channel.
Figure 2:
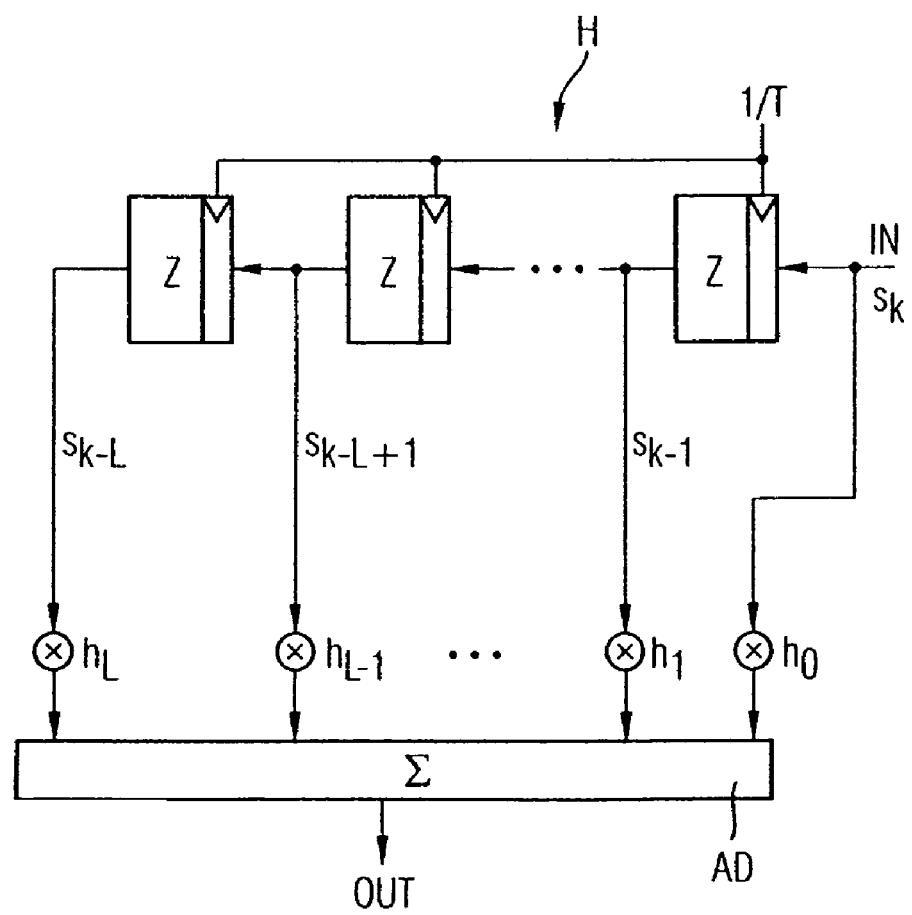
FIG. 2 shows the design of a model filter for modelling a transmission channel.
Figure 3:
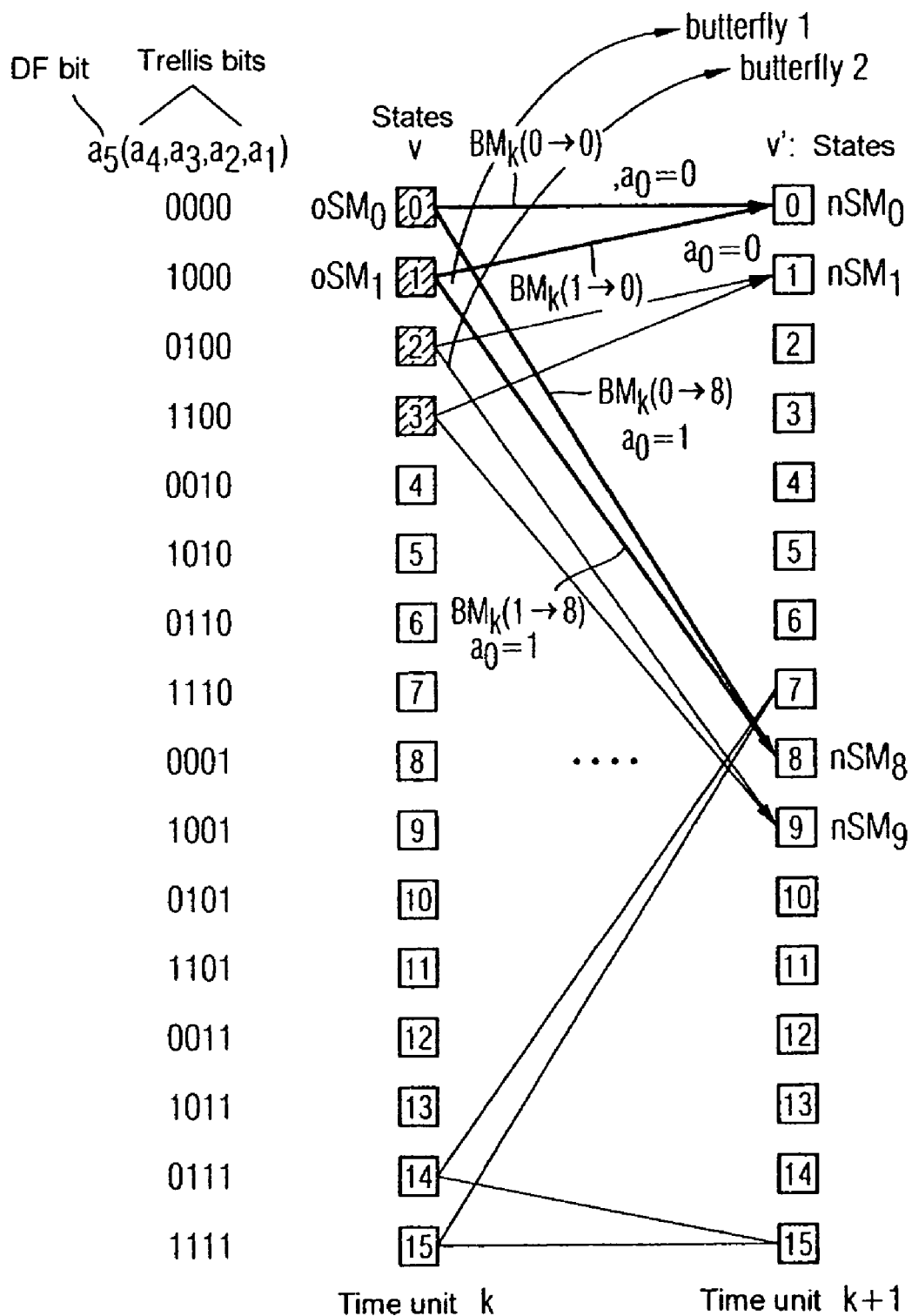
FIG. 3 shows a detail from a trellis diagram for two time units k and k+1 for L=5 and $L_{DF}$=4 for one channel.
Figure 4:
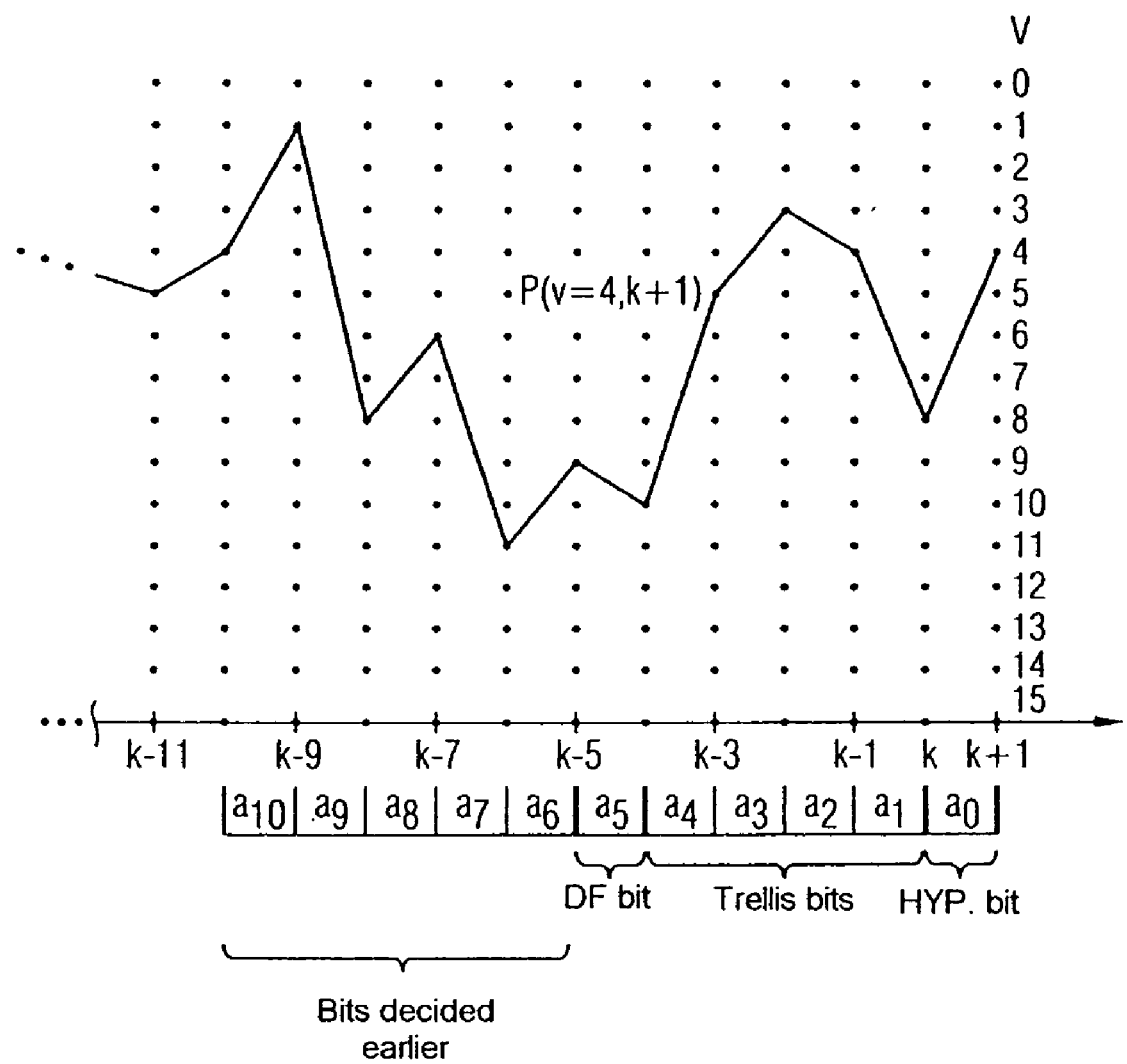
FIG. 4 shows a schematic illustration of a path which leads to a specific state in the time unit k+1 in the trellis diagram, and details of the associated path vector for one channel.

FIGS. 3 and 4 are intended to provide an exemplary explanation of Viterbi equalization using the DF method. By way of example, this considers the situation where p=2. A two-value symbol alphabet is used in the GSM (Global System for Mobile Communications) mobile radio standard. Furthermore, a channel model filter H as shown in FIG. 2 is used as the basis for the equalization of the channel under consideration (interference channel or payload channel) including L=5 memory cells. Each state in the trellis diagram is defined by four bits ($L_{DF}$=4). In consequence, the trellis diagram in each case has $2^4$=16 states, both for the interference channel and for the payload channel.

FIG. 3 shows a detail (time unit k and time unit k+1) from the associated trellis diagram (which applies both to the payload channel and to the interference channel) with 16 states. The processing of a trellis diagram such as this will first of all be explained in a general form, without including the consideration according to the invention of the other (second) channel. The states are annotated with the index v and are illustrated over the time units k and k+1 by means of the small boxes which are numbered successively from 0 to 15. The first four memory cells of the model filter H can thus assume one of 16 possible channel states in each time unit.

It is assumed that the ACS operations relating to the time unit k have already been carried out. A state metric has then already been calculated for each of the 16 states of the time unit k. Furthermore, the path leading to each of these states (sequence of predecessor states) is fixed. The "old" state metric value calculated for the state v, v=0, . . . , 15, in the time unit k is annotated $oSM_v$.

The object of the ACS operation is to calculate a new state metric value for each destination state v' in the time unit k+1. The new state metric values calculated for the destination states in the time unit k+1 are annotated $nSM_{v'}$, v'=0, . . . , 15.

The new state metric values for the destination states are calculated as follows using the known VA:

The destination state v'=0 is considered first of all. By means of the value of the hypothetical bit $a_0$=0, the destination state v'=0 for the time unit k+1 is reached either from the state v=0 or from the state v=1 in the time unit k. The sums $oSM_0+BM_k(0\rightarrow0)$ and $oSM_1+BM_k(1\rightarrow0)$ are formed (ADD operation) in order to decide which is the more probable of these two predecessor states, and thus which is the more probable of the two possible transitions. In this case, $BM_k(0\rightarrow0)$ denotes the branch metric value associated with the transition from the predecessor state v=0 to the destination state v'=0, and $BM_k(1\rightarrow0)$ denotes the branch metric value associated with the transition from the predecessor state v=1 to the destination state v'=0.

The smaller of the two sum values is determined (COMPARE Operation) and becomes the new state metric value $nSM_0$ for the destination state v=0 in the time unit k+1, that is to say $nSM_0=\min(oSM_0+BM_k(0\rightarrow0); oSM_1+BM_k(1\rightarrow0))$. The associated transition is selected as the more probable of the two possible transitions (SELECT Operation). The more probable transition as well as the more probable predecessor state are in this way determined for each destination state v=0, . . . , 15 in the time unit k+1. One ACS operation therefore has to be carried out for each destination state.

The two other possible transitions from the predecessor states v=0, 1 in the time unit k likewise lead to the same destination state, to be precise v=8. The transitions 0→0, 1→0, 0→8, 1→8 are referred to as butterfly 1 (since their shape is similar to that of a butterfly). A second butterfly—butterfly 2—is defined by the transitions 2→1, 3→1 and 2→9, 3→9. An eighth butterfly is also shown in FIG. 3, and is defined by the transitions 14→7, 14→15, and 15→7, 15→15.

"Processing of the trellis diagram" means carrying out all the ACS operations for a specific time unit k. The ACS operations are preferably carried out butterfly by butterfly, that is to say in the forward direction. This procedure, which is known from the prior art, has the advantage that only two old state metric values need be called up (for example for the butterfly 1, the state metric values $oSM_0$ and $OSM_1$) in order to carry out two ACS operations.

The states of the trellis diagram v=0, . . . , 15 are defined in a bit-inverted sequence:
State v=0: 0000
State v=1: 1000
State v=2: 0100
. . . .
State v=14: 0111
State v=15: 1111

According to FIG. 2, the states are composed of the hypotheses for the last four bits $a_4$, $a_3$, $a_2$, $a_1$ entered in the channel model filter H. A bit $a_5$ (or else a number of such bits) which has or have previously been entered in the channel model filter H (hypothetically) may be used as the DF bit for the channel under consideration (payload channel or interference channel). It is not used for the definition of the trellis states for this channel.

The ACS operations which have been explained with reference to FIG. 3 are processed time unit by time unit, thus resulting in a path being drawn through the trellis diagram for each state v=0, ..., 15. FIG. 4 shows, in an abstracted form, a path P(v=4, k+1), which leads to the state v=4 in the time unit k+1. The respective hypothetical bits $a_{10}$, ..., $a_5$, $a_4$, $a_3$, $a_2$, $a_1$, $a_0$, of the transitions of which the specific path P(v=4, k+1) is composed are indicated underneath the trellis diagram. Since one path leads to each state v=0, ..., 15, 16 path vectors of the form described above exist.

Figure 5:
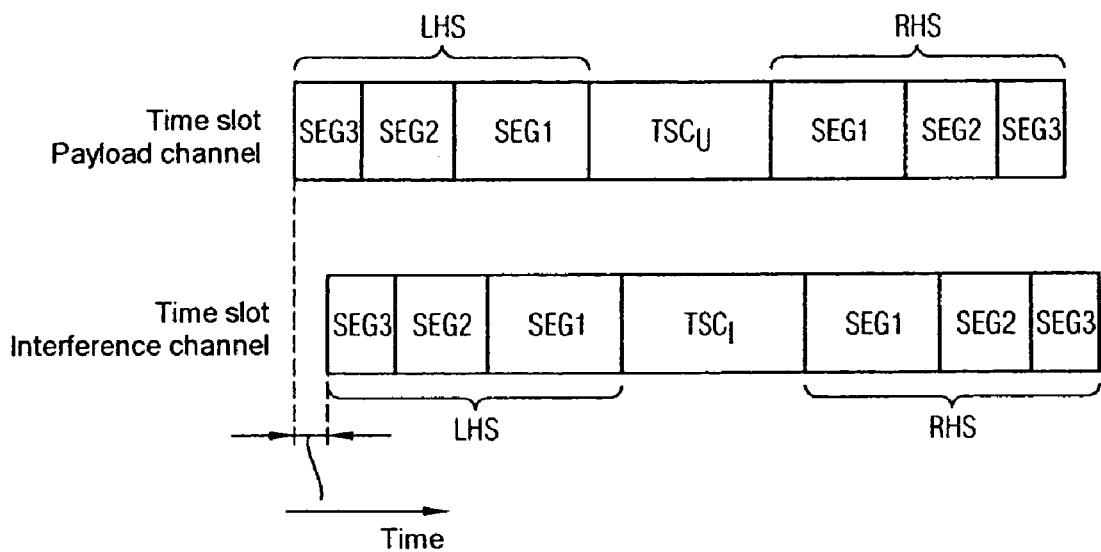
FIG. 5 shows a schematic illustration of a time slot in the payload channel and of a time slot in the interference channel related to the reception time.

The method according to the invention relates to a specific time sequence for the processing of the trellis diagram for the payload channel and for the trellis diagram of an interference channel (or else a number of interference channels). This is explained as follows:

FIG. 5 shows one time slot for the payload channel and one time slot for the interference channel, on the basis of their timing on reception in the receiver. The two time slots have a left-hand data section LHS (a left half slot), a right-hand data section RHS (right half slot) as well as an intermediate section $TSC_u$ (payload channel) and $TSC_I$ (interference channel), in which respective training sequences (TSC: training sequence code) are transmitted. The training sequences are known in the receiver and are used for channel estimation.

FIG. 6 shows the processing (according to the invention) of the trellis diagram for the payload channel and the trellis diagram for the interference channel in the processing sequence. The illustration relates to the processing of the left half time slot LHS. The processing of the right-hand half time slot is then carried out in precisely the same way.

First of all, it is assumed that one processing interval extends over the entire left-hand half time slot LHS. In the example illustrated here, this comprises 58 symbols.

(1) In a first processing step, the trellis diagram for the payload channel is processed without considering the interference channel. As already mentioned, the processing extends over the entire left-hand half time slot LHS. The branch metric values $BM_k$ can be stated in the following form:

$$BM_k = \left| X_k - \left( \sum_{i=0}^{L} hu_i(1 - 2 \cdot a_{Ui}) \right) \right|^2 \quad (4)$$

$$= \left| X_k - \left( \underbrace{\sum_{i=L_{DF}+1}^{L} hu_i(1 - 2 \cdot a_{Ui})}_{\text{DF contribution user}} + \underbrace{\sum_{i=1}^{L_{DF}} hu_i(1 - 2 \cdot a_{Ui})}_{\text{Trellis contribution user}} + \underbrace{hu_0(1 - 2 \cdot a_{U0})}_{\text{hyp. Symb. Contribution user}} \right) \right|^2$$

In this case, $hu_i$, i=0, 1, ..., L, denote the channel coefficients for the payload channel, and $a_{Ui}$ the bits on the payload channel. The use of a DF contribution for the payload channel is optional, that is to say it is also possible for L to equal $L_{DF}$. In the example discussed above (L=5), 64 possible different estimated values occur for the convolution products $$\sum_{i=0}^{L} hu_i(1 - 2 \cdot a_{Ui})$$

in the payload channel, and are distinguished by the index j:

$$\sum_{i=0}^{L} hu_i(1 - 2 \cdot a_{ij}), \; j = 0, \ldots, 63 \quad (5)$$

where, for $a_j=(a_{5j},a_{4j},a_{3j},a_{2j},a_{1j},a_{0j})$:

$a_j=(0,0,0,0,0,0), \ldots, (1,1,1,1,1,1)$ for j=0, ..., 63.

These 64 convolution products (or else partial sums of them) can be calculated, after a channel estimation process, in a digital signal processor, and remain unchanged for the time period until the next channel estimation process.

The trellis diagram for the payload channel is now processed over the entire left-hand halftime slot LHS, that is to say 58 time units. As will be explained in more detail later, the hardware accelerator is supplied in each time unit k with the current received value $X_k$ and with the convolution products (or partial sums of them) based on equation (5). Once the left-hand half time slot LHS of the trellis diagram for the payload channel has been processed, a sequence of hard-decided output values is available, so-called hard output values $b_1, \ldots, b_{k-L}, \ldots, b_k, \ldots, b_{58}$, (that is to say $b_m$, m=1, ..., 58).

(2) The trellis diagram for the interference channel is processed in a second processing step, and extends over the same processing time interval (LHS) in the trellis diagram for the interference channel, that is to say over the same 58 time units in the example under consideration here. In contrast to step (1), which was described above, however, the other channel (payload channel) is taken into account by means of a DF contribution:

$$BM_k = \left| X_k - \left( \underbrace{\sum_{i=0}^{L} hu_i(1 - 2 \cdot b_{k-i})}_{\text{DF Contribution user}} + \sum_{i=0}^{L} hi_i(1 - 2 \cdot a_{li}) \right) \right|^2 \quad (6)$$

$$= \left| X_k - \left( \underbrace{\sum_{i=0}^{L} hu_i(1 - 2 \cdot b_{K-i})}_{\text{DF Contribution user}} + \underbrace{\sum_{i=L_{DF}+1}^{L} hi_i(1 - 2 \cdot a_{li})}_{\text{DF Contribution interference source}} + \underbrace{\sum_{i=1}^{L_{DF}} hi_i(1 - 2 \cdot a_{li})}_{\text{Trellis contribution interference source}} + \underbrace{hi_0(1 - 2 \cdot a_{l0})}_{\text{hyp. Symb. Contribution interference source}} \right) \right|$$

In this case, $hi_i$, $i=0, 1, \ldots, L$, denote the channel coefficients for the interference channel, and $a_{1i}$ denotes the bits on the interference channel. The use of a DF contribution for the interference channel is optional, that is to say it is possible for L to be equal to $L_{DF}$. In the case of the example discussed above (L=5), 64 different values occur for the convolution product $$\sum_{i=0}^{L} hi_i(1 - 2 \cdot a_{li})$$

in the interference channel, which will differ from the index j:

$$\sum_{i=0}^{L} hi_i(1 - 2 \cdot a_{ij}) \quad j = 0, \ldots, 63 \quad (7)$$

where, once again, for $a_j=(a_{5j}, a_{4j}, a_{3j}, a_{2j}, a_{1j}, a_{0j})$:

$a_j=(0,0,0,0,0,0), \ldots, (1,1,1,1,1,1)$ for $j=0, \ldots, 63$.

According to the invention, the DF contribution for the payload channel (that is to say the estimated value of the symbol obtained in the relevant time unit k in the payload channel, which results from the convolution of the channel coefficients for the payload channel with the hard output values calculated in step (1) is subtracted from the received values $X_k$. The process of subtraction of the DF contribution for the payload channel from the received value $X_k$, which takes place once in each time unit, is carried out in the DSP. The hardware accelerator is fed over the processing time interval with the corrected received values $X_k^{corr}$ in accordance with:

$$X_k^{corr} = X_k - \sum_{i=0}^{L} hu_i(1 - 2 \cdot b_{k-i}) \quad (8)$$

The branch metric values calculated by the hardware accelerator are thus:

$$BM_k = \left| X_k^{corr} - \sum_{i=0}^{L} hi_i(1 - 2 \cdot a_{ij}) \right|^2, \quad j = 0, \ldots, 63, \quad (9)$$

that is to say this differs from the branch metric values calculated in a conventional equalizer only by the use of a corrected sample value $X_k^{corr}$ instead of $X_k$.

The convolution products $$\sum_{i=0}^{L} hi_i(1 - 2 \cdot a_{ij})$$

used in the hardware accelerator are the estimated values for the interference channel. Once the LHS for the interference channel has been processed, the hard output values are available for the interference channel trellis diagram (calculated taking into account the interaction with the payload channel). The sequence of the hard output values from the interference channel calculated over the processing interval $m=1, \ldots, 58$ during the Viterbi equalization process are annotated $c_1, \ldots, c_{k-L}, \ldots, c_k, \ldots, c_{58}$ (that is to say $c_m$, $m=1, \ldots, 58$).

(3) The payload channel is processed again over the same processing time interval (in this case: LHS) in a third processing step. In this case, but in contrast to the first processing of this processing time interval in step (1), the influence of the interference channel, which results from the convolution of the channel coefficients for the interference channel with the hard output values calculated in step (2), is subtracted from the basic received values $X_k$. According to the invention, the subtraction of the convolution products from the received values $X_k$ is carried out in the DSP, so that the hardware accelerator is fed with the corrected received values:

$$X_k^{corr} = X_k - \sum_{i=0}^{L} hi_i(1 - 2 \cdot c_{k-i}) \quad (10)$$

The appropriate received value $X_k$ must be corrected in each time unit k.

The estimated values $$\sum_{i=0}^{L} hu_i(1 - 2 \cdot a_{ij})$$

for the payload channel symbols are identical to the convolution products (estimated values for the payload channel) used in step (1). At the end of the processing time interval (in this case LHS), the hard output values and the soft output values of the trellis diagram for the payload channel (corrected by the interaction with the interference channel) are available in the time interval (LHS) under consideration. This completes the equalization of the received values in the time interval under consideration, with the interference source being eliminated.

The hard output values for the interference channel and for the payload channel can be determined using the following method: the state with the minimum metric is determined in each time unit k. The associated state vector includes the best path leading to this state in the relevant time unit. A bit or symbol is taken at the appropriate point on the best path (for example $a_{10}$ in FIG. 4) as the hard output value of a previous time unit. This method ensures that a decision is made for a hard output value for a previous time unit only when a convergence time interval (for example 10 time units) has already been exceeded.

Figure 7:
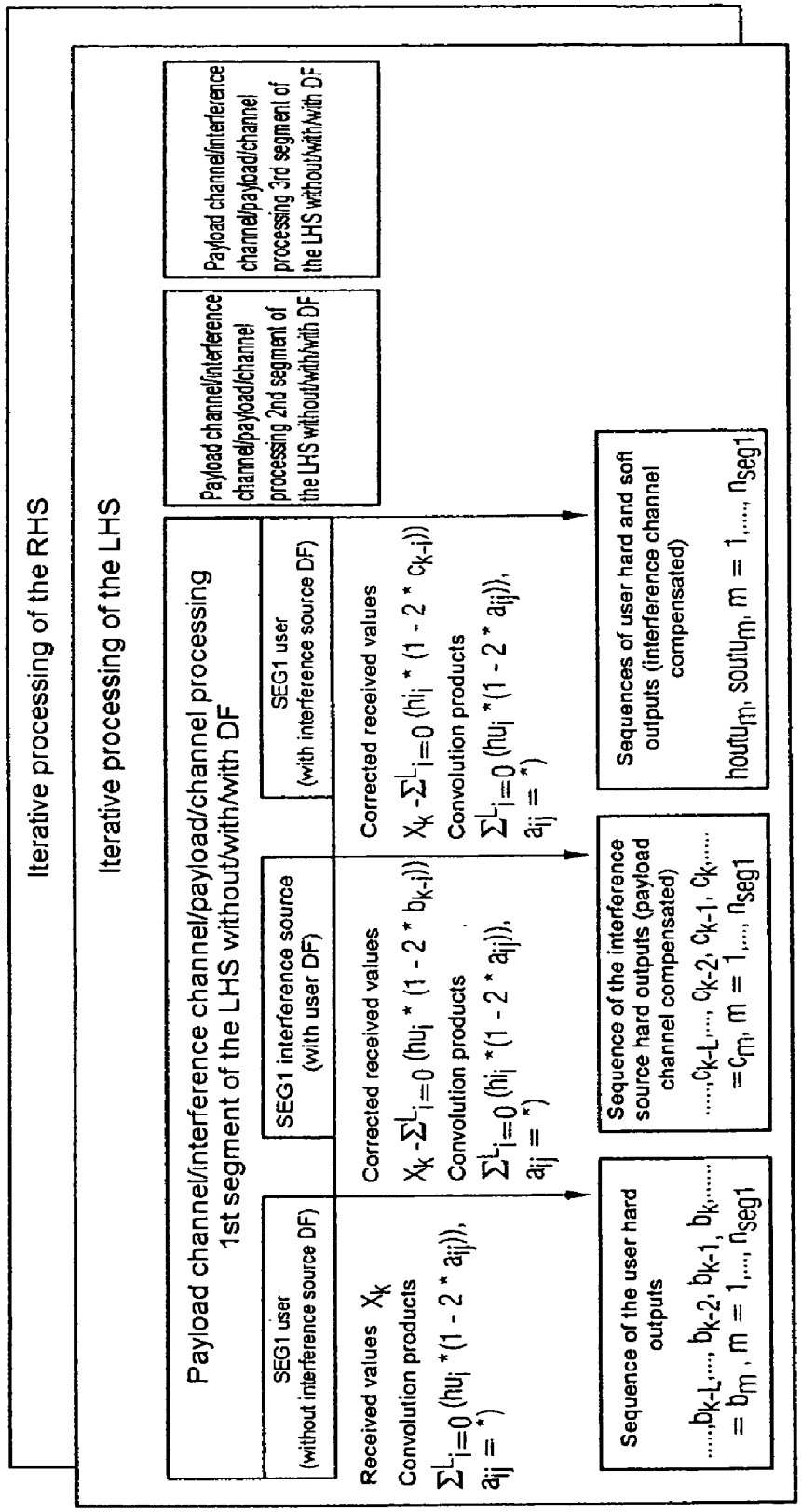
FIG. 7 shows a schematic illustration in order to explain the processing of the trellis diagram for the payload channel (twice) and of the trellis diagram for the interference channel (once) with half a time slot being subdivided into three intervals.

FIG. 7 shows a variant of the method described above, in which the left-hand half time slot LHS and the right-hand half time slot RHS are subdivided into segments SEG1, SEG2, SEG3, see also FIG. 5. The processing time intervals are now defined by the segments SEG1, SEG2, SEG3. The corresponding method sequence is illustrated in FIG. 7. Each segment is equalized iteratively in its own right individually using the steps (1) to (3) explained above. First of all, the first segment SEG1 of the LHS is equalized, after which the second segment SEG2 of the LHS is equalized, with the third segment SEG3 of the LHS being equalized last of all. The iterative segment-by-segment equalization LHS is followed by the likewise iterative, segment-by-segment equalization of the RHS. The lengths of the individual segments SEG1, SEG2 and SEG3, respectively, are denoted by Seg1, Seg2, Seg3.

Segments SEG1, SEG2, SEG3 can be defined in the individual half time slots in the case of the equalization process based on half time slots, as illustrated in FIG. 6, as well, in which case it is possible to use (different) channel parameters, updated for example by means of channel tracking, within these segments. These segments SEG1, SEG2, SEG3 are, however, in contrast to the procedure illustrated in FIG. 7, equalized successively and directly for each channel, that is to say the complete half time slot for the payload channel is processed first of all, after which the complete half time slot for the interference channel is processed, with the complete half time slot for the payload channel finally being processed once again. The sequence in which the individual segments SEG1, SEG2 and SEG3 in the LHS for the payload channel and for the interference channel are equalized in FIG. 6 is indicated by the numbers (1), (2), . . . (9) in brackets.

The method according to the invention can be modified in the following ways:

so-called "channel tracking" can be used for the segment-by-segment iterative equalization of the left-hand and right-hand half time slots LHS and RHS, respectively.

Channel tracking means that different channel coefficients $hu_i$ and $hi_i$ are in each case used in the different segments SEG1, SEG2, SEG3. The segment-by-segment updating of channel coefficients (for example by means of channel tracking, during which a channel estimation process is now carried out repeatedly on the basis of symbols that have already been decided rather than on the basis of the training sequence) means increased computation complexity for the DSP, but in general improves the quality of the equalization process. Thus, in the case of channel tracking the hardware accelerator must be provided with different convolution products for each segment.

A further improvement in the equalization performance can be achieved by channel-related prefiltering of the received values $X_k$. In this case, different received values $Xu_k$ and $Xi_k$ are used, respectively, as received values for the calculation of the branch metric values in the payload channel and in the interference channel.

It should also be mentioned that the DF contribution for the payload channel in steps (1) and (3) and the DF contribution for the interference channel in the step (2) are optional, that is to say "intra-channel DF contribution" is not required. The DF contribution for the payload channel in step (2) as well as the DF contribution for the interference channel in step (3), which may be referred to as "inter-channel DF contributions" are, on the other hand, essential, since they provide the interaction between the two channels (payload channel, interference channel).

If required, non-iterative equalization may also be carried out instead of iterative equalization (with double equalization for the payload channel), in which the step (1) is omitted, and the step (2) is carried out with uncorrected sample values $X_k$.

More than one interference channel may also be taken into account in an analogous manner.

A channel depth of four time units is used for the most important application of the TU channel model (TU: Typical Urban; the speed of the mobile station is restricted to a maximum speed of 50 km/h). Furthermore, the prefiltering of the received values may also be omitted for GMSK (Gaussian Minimum Shift Keying).

Figure 8:
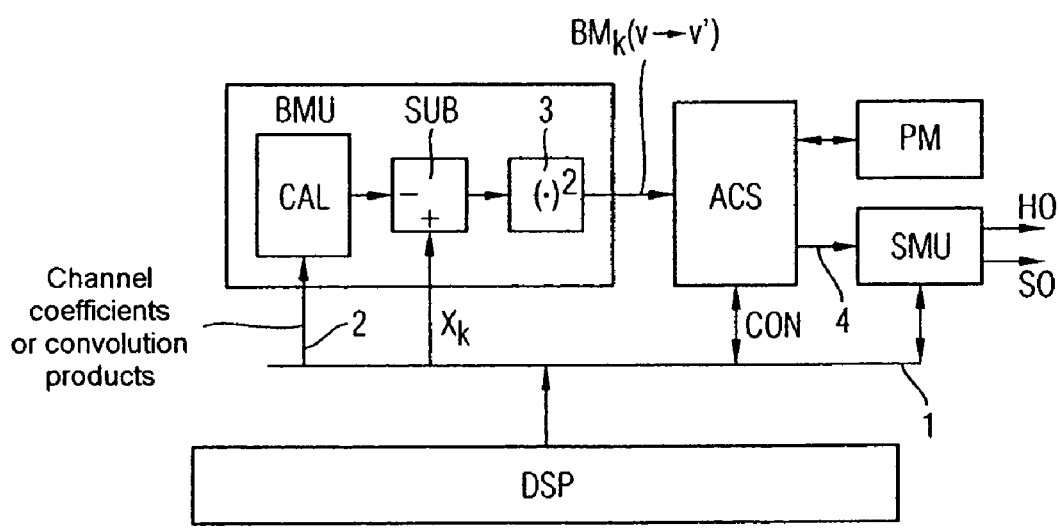
FIG. 8 shows a schematic illustration of the architecture of an equalizer which comprises a DSP and a hardware accelerator.

FIG. 8 shows a highly simplified illustration of the design of a known receiver structure for equalization of a payload data signal, which comprises a DSP and a hardware accelerator which is connected to the DSP. Architectures such as these are known and can be used for the method according to the invention without any design modification. The modifications required are restricted solely to firmware changes, which relate mainly to the calculation of the corrected received values $X_k^{corr}$ in the DSP, and to the control of the segment-by-segment trellis processing in the hardware accelerator. This represents a major advantage of the method according to the invention for its implementation on existing receiver structures.

A DSP is connected via a bus 1 to a unit for calculation of branch metric values BMU (Branch Metric Unit), a unit for carrying out the ACS operations ACS and a unit for carrying out reverse path tracking (SMU: Survivor Memory Unit). The DSP uses a datalink 2 to inform the BMU of the current channel coefficients, or the convolution products themselves, comprising channel coefficients and data symbols. If channel coefficients are signalled, the convolution products are calculated in the BMU unit CAL. Otherwise, the unit CAL may be in the form of a memory.

The convolution product is subtracted from the received value $X_k$ in a downstream subtractor SUB. The subtraction result is squared in a squarer 3, and is provided to the ACS unit as the branch metric value $BM_k(v \rightarrow v')$. The ACS unit processes the trellis diagram in each time unit k, and for this purpose is controlled by the DSP by means of a control signal CON. During the processing, the ACS unit accesses path metrics which are stored in a path metric memory PM and which are updated after each time unit. The hypothetical symbols of the winner paths are emitted at the output 4 of the ACS unit. The unit SMU carries out the trace-back operation and determines the hard and soft output values HO, SO of the Viterbi equalization process.

An architecture such as this for a Viterbi equalizer is already known, for example, from the document DE 100 32 237 A1.

The following changes must essentially be carried out for the implementation of the method according to the invention:

During the iterative equalization for one processing interval (half time slot or segment of it), the corrected sample values $X_k^{corr}$ are transmitted from the DSP to the unit BMU instead of the sample values $X_k$ in the steps (2) and (3).

A processing interval (half time slot or segment) is processed three times (unless it is equalized iteratively: twice). To this extent, the ACS unit is instructed via the controller CON to process the same processing interval in the respective trellis diagram three times (twice successively). Furthermore, the channel coefficients or convolution products for the interference channel, which must have been previously transmitted from the DSP to the unit CAL, are used in the processing step (2).

As can be seen from the above statements, all of these measures can be carried out by reprogramming of the DSP, that is to say on a software basis.

I claim:

1. A method for iterative equalization of a signal which is transmitted via a payload channel, taking into account at least one interference channel, comprising the steps of:
   (a) processing of the trellis diagram for the interference channel over an interval of time units;
   (b) correction of the symbols received in the interval of time units by means of information which has been obtained during the processing of the trellis diagram for the interference channel; and
   (c) processing of the trellis diagram for the payload channel over the same interval of time units using the corrected symbols.

2. The method according to claim 1, wherein the symbols which are received in the interval of time units are corrected in a software module.

3. The method according to claim 1, wherein the trellis diagrams for the payload channel and for the interference channel are processed by means of a dedicated hardware circuit.

4. The method according to claim 1, wherein the correction step (b) comprises:
   subtraction of a DF contribution from the interference channel from the received symbol.

5. The method according to claim 4, wherein the DF contribution from the interference channel comprises a convolution product of channel coefficients for the interference channel and the hard-decided data symbols for the interference channel.

6. The method according to claim 1, wherein the following steps are carried out before step (a):
   (i) initial processing of the trellis diagram for the payload channel over the interval of time units; and
   (ii) correction of the symbols received in the interval of time units by means of information which has been obtained during the processing of the trellis diagram for the payload channel in step (i) with the symbols corrected in step (ii) being used for the interference channel trellis processing in step (a).

7. The method according to claim 6, wherein the correction step (ii) for the symbols for the interference channel trellis processing comprises:
   subtraction of a DF contribution from the payload channel from the received symbols.

8. The method according to claim 7, wherein the DF contribution from the payload channel comprises a convolution product of channel coefficients for the payload channel and the hard-decided data symbols for the payload channel.

9. The method according to claim 1, wherein the length of the interval of time units is controllable.

10. The method according to claim 1, wherein the interval of time units represents half a time slot.

11. The method according to claim 1, wherein half a time slot contains between 2 and 5 intervals of time units.

12. The method according to claim 1, wherein equalization is carried out in accordance with the EDGE Standard.

13. An apparatus for iterative equalization of a signal which is transmitted via a payload channel, taking into account at least one interference channel, comprising:
   (a) means for processing of the trellis diagram for the interference channel over an interval of time units;
   (b) means for correction of the symbols received in the interval of time units by means of information which has been obtained during the processing of the trellis diagram for the interference channel; and
   (c) means for processing of the trellis diagram for the payload channel over the same interval of time units using the corrected symbols.

14. The apparatus according to claim 13, comprising a software module for correcting the symbols which are received in the interval of time units.

15. The apparatus according to claim 13, comprising a dedicated hardware circuit for processing the trellis diagrams for the payload channel and for the interference channel.

16. The apparatus according to claim 13, further comprising means for subtraction of a DF contribution from the interference channel from the received symbol.

17. The apparatus according to claim 16, wherein the DF contribution from the interference channel comprises a convolution product of channel coefficients for the interference channel and the hard-decided data symbols for the interference channel.

18. The apparatus according to claim 13, wherein the length of the interval of time units is controllable.

19. The apparatus according to claim 13, wherein the interval of time units represents half a time slot.

20. The apparatus according to claim 13, wherein half a time slot contains between 2 and 5 intervals of time units.

* * * * *

UNITED STATES PATENT AND TRADEMARK OFFICE
CERTIFICATE OF CORRECTION

PATENT NO.         : 7,372,923 B2                                          Page 1 of 1
APPLICATION NO. : 11/015042
DATED              : May 13, 2008
INVENTOR(S)        : Burkhard Becker It is certified that error appears in the above-identified patent and that said Letters Patent is hereby corrected as shown below:

On the face of the Patent:

Under Other Publications, at column 2, line 5, "Chochannel" should read --Cochannel--

In the Specification:

At column 2, line 32, "unit k→destination" should read --unit k $\rightarrow$ destination--

At column 8, line 54, "OSM$_1$)" should read --oSM$_1$)--

At column 9, line 51, "|" should read --= |--

At column 10, line 33, "halftime" should read --half time--

At column 11, line 10, "b$_{K-i}$)" should read --b$_{k-i}$)--

At column 11, line 18, ")" should read --) | $^2$--

Signed and Sealed this

Second Day of September, 2008

JON W. DUDAS
*Director of the United States Patent and Trademark Office*